(12) United States Patent
Qian

(10) Patent No.: US 9,925,960 B2
(45) Date of Patent: Mar. 27, 2018

(54) ELECTRIC CAR WASHER

(71) Applicant: CHANG-SHA MEILING ELECTRONICS TECHNOLOGY CO.,LTD., Changsha (CN)

(72) Inventor: Zhixiang Qian, Changsha (CN)

(*) Notice: Subject to any disclaimer, the term of this patent is extended or adjusted under 35 U.S.C. 154(b) by 119 days.

(21) Appl. No.: 14/960,383

(22) Filed: Dec. 6, 2015

(65) Prior Publication Data
US 2016/0082931 A1 Mar. 24, 2016

Related U.S. Application Data

(63) Continuation-in-part of application No. PCT/CN2014/076310, filed on Apr. 26, 2014.

(30) Foreign Application Priority Data

Jun. 6, 2013 (CN) .................. 2013 2 0324443 U

(51) Int. Cl.
*B60S 3/04* (2006.01)
*B05B 9/01* (2006.01)
*B08B 3/02* (2006.01)

(52) U.S. Cl.
CPC ............ *B60S 3/044* (2013.01); *B05B 9/01* (2013.01); *B08B 3/026* (2013.01)

(58) Field of Classification Search
CPC ...................................... B60S 3/044
See application file for complete search history.

(56) References Cited

U.S. PATENT DOCUMENTS 1,185,333 A * 5/1916 Keltner .................. F16K 15/03
137/269.5
2009/0133726 A1* 5/2009 Montoya ............... B05B 15/061
134/123

* cited by examiner

*Primary Examiner* — Jason Ko
(74) *Attorney, Agent, or Firm* — Wayne & Ken, LLC; Tony Hom

(57) ABSTRACT

A portable electric car washer is mainly formed by a soft water bag (1), a change valve (2), a belt wheel outer box, an electronic water pump, a water gun, and a water discharging pipe (5). The soft water bag (1), the water discharging pipe (5) and water feeding and discharging openings of the water pump are all connected to the change valve (2). The switching of the change valve (2) can make water pass through the water discharging pipe (5), is filled into the water bag (1) or ejected out of the water bag (1). After all water is discharged from the soft water bag (1), the soft water bag (1) can be placed in the belt wheel outer box. The belt wheel outer box is provided with a castor to movably support the soft water bag (1). The belt wheel outer box is mainly formed by a box body (3) and a cover plate (4). The castor is mounted below the cover plate (4), and the cover plate (4) can be taken off and is cushioned and fixed on a bottom of the box body (3) to movably support the box body (3). The cover plate (4) can cover the box body (3), so that the castor can be placed in the box body (3) and after being placed in, the box body (3) is like a suitcase. The portable electric car washer of the present invention is small, delicate, and portable, needs less power to take water, is easy to be placed in, is well compatible with a water source, has low requirements on cleanliness of the water source, does not require manually injecting water to start water pumping, and can also be used for rescue if a vehicle is trapped in water.

13 Claims, 8 Drawing Sheets

ELECTRIC CAR WASHER

CROSS-REFERENCE TO RELATED APPLICATIONS

This application is a continuation-in-part of International Patent Application No. PCT/CN2014/076310 with an international filing date of Apr. 26, 2014, designating the United States, now pending, and further claims priority benefits to Chinese Patent Applications No. 201320324443.7, filed Jun. 6, 2013. The contents of all of the aforementioned applications, including any intervening amendments thereto, are incorporated herein by reference.

TECHNICAL FIELD

The present invention relates to the technical field of equipment, in particular to a portable electric car washer.

BACKGROUND OF THE PRESENT INVENTION

Most of the existing portable electric car washers adopt a rigid open water tank which is provided with a water pipe having several meters in length and capable of surrounding a car by a circle to spray water. In use, the electric car washer is connected to a car cigarette lighter for power connection, the water tank is stationary, and the water gun surrounds the car to spray water along with a user. The example is "Cylindrical portable electric car washer" with the application number of 201120254219.6.

The existing car washer has the following disadvantages of:

1. Large volume and poor portability; 2. arduous work for taking water by hand, especially for women; 3. small volume; if the volume is made to be large, the portability is much poorer, and it is difficult for putting the car washer into trunks of some small cars; 4. a bucket has to be placed under a tap for collecting water, so it is troublesome to take water and picky about the source of water; for example, the water cannot be directly taken from a wash basin in the public toilet at a gas station but a gourd ladle is needed instead to fetch water; 5. it is troublesome to collect the water pipe due to the lengthiness of the pipe as well as wear and water and dirt stains due to drag on the ground in use; and 6. when a car washer with flexible castors is placed in the trunk of a car, it is easy to cause shake and abnormal noise which will thus interfere with driving. The present invention aims to solve these problems as well as the following problems at the same time.

1. Based on the appeal for energy conservation and environmental protection, the government calls on people to wash their cars with such non-drinking water as collected rainwater, pond water and river water instead of drinking water. However, such appeal receives rare responses due to the main reason as follows: the above non-drinking water has low cleanliness, so tiny impurities in the water can easily block the strainer of the car washer and cause a failure, while frequent strainer cleaning and replacement also increases time and economic cost, 2. People tend to wash their cars by the source of water due to tiring and inconvenient water fetching so that waste water after car washing pollutes the source of water.

SUMMARY OF THE PRESENT INVENTION

The present invention is designed based on the starting point that a car washer moves around a car along with a user. Castors are mounted below the outer box of the car washer to assist in movement, and a wire capable of surrounding the car by at least half a circle in length is used, which is convenient for matching with a short water pipe to facilitate storage. The present invention has the novelty that: a manual reversing water valve is added on the water way, which makes it possible to use a soft water bag on the car washer. The reversing water valve can change the direction of a water flow, so that a water pump not only can fill water into the water bag, but also can draw water from the water bag to spray and wash a car.

The traditional water bags cannot achieve such full closing work. Each of the traditional water bags has an openable cover to facilitate water filling. For the convenience of lifting the water bag during water filling, a handle type device beneficial for hand touch is also designed usually.

As shown in FIG. 1, the electric car washer is mainly formed by a soft water bag (1), a change valve (2), a box body (3), a cover plate (4), an electric water pump, a water gun, and a water discharging pipe (5). The soft water bag (1), the water discharging pipe (5) and water feeding and discharging openings of the water pump are all connected to the change valve (2). The switching of the change valve (2) can make water pass through the water discharging pipe (5) to be filled into the water bag (1) or ejected out of the water bag (1). The soft water bag (1) is foldable and is fully sealed during work. After all water is discharged from the soft water bag (1), the soft water bag (1) can be placed in the box body (3). The cover plate (4) can cover the box body (3). Castors are mounted below the cover plate (4), and the cover plate (4) can be taken off and is cushioned and fixed under the box body (3) to movably support the box body (3). The car washer moves along with a user during spraying for car washing. For more conciseness and convenience, the car washer is designed as follows: the water discharging pipe (5) is not long enough to surround the car by half a circle, and the water discharging pipe (5) sustains tension by a user to drag the car washer to move along with the user.

The outer box with castors in FIG. 1 is provided with four castors mounted below the cover plate, and the cover plate is cushioned under the outer box to constitute a trolley. The outer box with castors moves around the car along with the user when the user holds the water gun to spray around the car. Both the water pump and the change valve are mounted in the box body (3). The cover plate (4) covers the box body (3), so that the castors can be placed in the box body (3), and the water gun, the water discharging pipe, etc. can also be placed in the box body (3). After being placed in, the box body is like a suitcase. In order not to break the water bag during water pumping: the water pump is provided with a pressure switch. The switch can control the on-off of a water pump circuit according to water pressure. The pressure switch is set to be smaller than the water pressure at which the water bag is filled with water and broken.

In the above basic scheme, a wire is connected with a car cigarette lighter socket to supply power to the car washer. The length sum of the wire and the water discharging pipe (5) can at least surround the car by half a circle. The wire is coiled via a take-up reel (6). Of course, a battery can be directly installed on the car washer as a power source. Alternatively, the cigarette lighter power supply mode and the battery power supply mode are combined. The scheme can also be further perfected based on the following reasons and demands to achieve better effect. The scheme will be described below in detail.

I. Series and Parallel Enhanced Water Pump

Reason: A large flow is needed to fill water into the water bag, otherwise waiting time is long, while a great water pressure is needed during spraying for car washing so as to enhance washing capability. These two demands are contradictory. A water pump with large flow consumes too much water for car washing, while the flow of a water pump with great pressure is not certainly large.

Measure: Two or more than two water pumps the quantity is preferably an even number) are equipped for the car washer; the water feeding and discharging openings of the car washer are connected to another change valve, and the switching of the change valve makes the water pumps connected in parallel or in series. The switch of the change valve is linked to the change valve in FIG. 1, so that the water pumps are connected in parallel during water filling and are connected in series during spraying for car washing.

As shown in FIG. 4, another one electric water pump and another one change valve (203) are added on the basis of the basic scheme. The water feeding and discharging openings of the two water pumps are connected to the change valve (203), and the switching of the change valve (203) makes the two water pumps connected in parallel during water filling and are connected in series during spraying. The integral body formed by the two water pumps and the change valve (203) is regarded as one enhanced electric water pump, and the water feeding and discharging openings of which are connected with another change valve. The overall water way of the enhanced electric water pump is shown in FIG. 5.

Effect: Water pumps connected in parallel can increase the flow to meet the water filling demand, while water pumps connected in series can increase the water pressure to meet the washing demand.

II. Hinged Door to Support Water Bag

Reason: The height of the outer box is desired to be designed as low as possible in order to make the car washer small in volume and portable, for example, to be placed below a seat in the car without occupying any space. The volume of the water bag is desired to be as large as possible in order to hold more water. However, these two demands are contradictory. Because the water bag is soft, a larger water bag needs to be supported by a higher outer box side wall, otherwise the water bag will collapse and even fail to the ground.

Measure: Two door panels like a hinged door (in top view) are installed in the open surface of the outer box. One side of the panels is fixed on the inner side wall of the outer box via a hinge, and a rotating shaft of the hinge is lower than the outer edge of the outer box. In this way, when the water bag is filled with water to expand, the water bag drives the door panels to open outwards and rest against the side wall so as to perform the function of supporting the water bag. Further, the inner surfaces of the door panels and the outer surface of the water bag need to be adhered. In this way, when the water bag is empty and collapsed, the door panels can be pulled to be closed.

As shown in FIG. 6: two door panels (401) which can be upwards opened in opposite directions are installed in the box body, and the rotating shaft (402) of the door panels is fixed below the open outer edge of the box body. The door panels opened upwards in opposite directions rest against the box body side wall (404) to support the soft water bag (400). The inner surfaces of the door panels are adhered to the outer surface of the soft water bag (400) When the soft water bag (400) becomes empty and collapsed, it pulls the door panels (401) to be closed via the adhesion part (403).

Effect: The car washer not only has small and convenient appearance, but also can meet the work of the large water bag.

III. Built-in Sponge in Water Bag

Reason: Because the water discharging pipe is filled with air when water is pumped into the water bag, it is easy to cause difficult water pumping or slow water pumping at the beginning. It is well-known that water pumping can only be optimized when the water feeding pipe of the water pump is usually injected with priming water. For the product in the basic scheme, if the change valve is switched to spray water for filling the water discharging pipe with water first and is then switched to the water pumping position before water pumping each time, water pumping will be efficient and convenient. However, the prerequisite is that water remaining last time must be left in the water bag.

Measure: A sponge is placed in the water bag. To prevent the sponge from blocking the water feeding and discharging openings due to shaking, the sponge shall be fixed on the inner wall of the water bag, for example, fixed on the top of the inner wall of the water bag;

Effect: After car washing is finished each time, water absorbed in the sponge is reserved as priming water for next time. The sponge only needs to be extruded by hand for use next time.

IV. Upper and Lower Dual Pipes of Water Bag

Reason: In the basic scheme shown in FIG. 1, the water bag is only connected with one water pipe which is used for both feeding water and discharging water. The configuration has one defect that when the water pipe is connected to the bottom of the water bag, the water filling speed will become slower and slower as water in the water bag is increased to cause increase in water pressure.

Measure: As shown in FIG. 7, the soft water bag has a water feeding opening (501) at the upper end and a water discharging opening (502) at the lower end. These two water openings are communicated with a two-position five-pass change valve.

V. Lighting for Car Washing

Reason: Users are too busy in working to wash cars in the daytime; it may be so hot in the daytime that car washing is tiring; during car washing in the sun, water drops are easy to focus sunlight to burn car paint, just like lenses. Therefore, the measure of facilitating users to wash cars in the night time shall be adopted.

Measure: A charging cell (battery) can be carried on the car washer as a power source. A lamp is installed on the water gun. The light of the lamp covers water splashes sprayed by the water gun. The lamp is connected with the power source of the car washer via a wire. The wire is wound around the outer wall of the water discharging pipe. The wire is connected with the outer box of the car washer and the lamp on the water gun via plugs. A switch is arranged on the circuit for controlling the lamp.

Effect: It is not necessary to wash a car under a street lamp even in the night time, and the light illuminates the water splashes, and the water splashes play the action of refraction to enhance the coverage of the light.

VI. Train Series Connection Technique

Reason: As a result of the limited size of the portable car washer and particularly its limited size of the water bag, it is difficult for the car washer to cope with certain large vehicles such as a bus. If the car washer is made to be larger, due to the limited sales of non-portable products, the production cost will be increased because of small yield. Thus it is good to place these small car washers in series connection to become a large one.

Measure: Hooks are arranged at the tail and the head of each car washer so that the car washers are connected end to end, like a train when connected in series. Water way connection: The water discharging openings of all train carriages are gathered with another thicker water pipe. It is preferable to mount two hooks at the front and the back ends of the upper cover so that the upper cover can cover the outer box when stored, and the hooks can be hanged as hanging buckle for buckling the box body.

Effect: Even a bus driver does not need to buy a dedicated car washer but only needs to buy a few more portable car washers and a gathering water pipe, and then connect the car washers in series into a train for intensive water discharging and spraying, with much higher water pressure and more water quantity.

VII. Water Discharging Pipe as Pull Rope

A movable car washer with castors in similar products is usually provided with a handle for people to drag. The handle is not necessary for the car washer of the present invention. When people hold the water gun to spray around the car, the water discharging pipe (5) is not long enough to surround the car by half a circle, and the water discharging pipe (5) sustains tension by the user to drag the car washer to move along with the user, as shown in FIG. 1. The length of the water discharging pipe should be as short as possible and is usually appropriate to be about 2-3 m. The length of the water discharging pipe is not recommended to exceed the suction height of the water pump. A jacket beneficial for hand holding can be arranged on the water discharging pipe to enhance user experience. The scheme makes the car washer small, delicate and portable and easy to be stored, The car washer has other characteristics that:

1. The car washer is provided with four castors, wherein two front castors are steerable castors capable of rotating on a horizontal plane, and the two rear castors are fixed.

2. The water pump is provided with a pressure switch. The switch can control the on-off of the water pump circuit according to water pressure. The pressure of the switch is set to be smaller than the water pressure at which the water bag is broken.

3. The water discharging pipe sustains tension during car washing to move around the car along with people to spray.

4. No openable water filling opening cover or handle is arranged on the water bag; no pulling handle or pushing handle is arranged on the outer box.

5. The water discharging pipe, the water gun, etc. can be placed in the outer box.

Product advantages: 1. Small size and portability. 2. Less power to take water. 3. Good compatibility with a water source. The car washer can take water from both washbasins in public toilets and streams or ponds. 4. The car washer is easy to be stored due to an automatic take-up reel and a shorter water pipe. 5. Because the water feeding and discharging pipes are combined into a whole, bidirectional water flows perform the effect of preventing the screen from blocking, and the car washer has low requirements for the cleanness of the water source. 6. The car washer does not require manually injecting water to start water pumping. 7. When a car falls into water, the water bag can be filled with air to play the action of a rescue balloon to help the driver who cannot swim to escape, or the water bag emerges from water to help indicating the position where the car falls into water.

DETAILED DESCRIPTION OF THE PRESENT INVENTION

Figure 1:
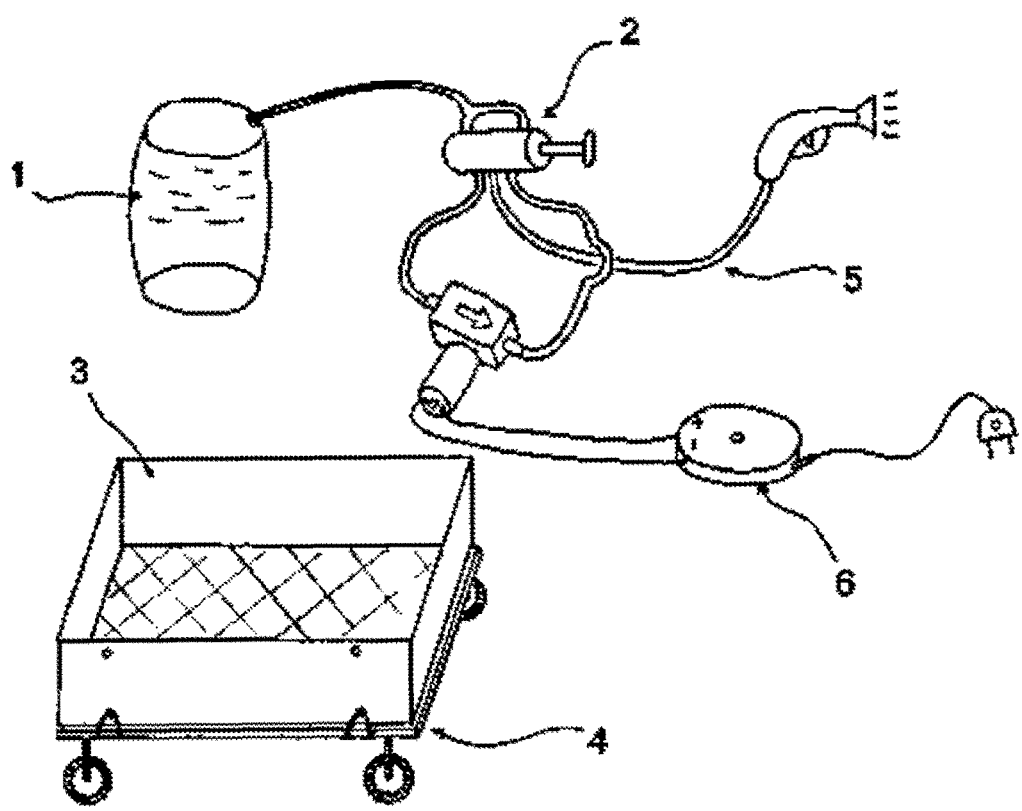
FIG. 1 is a diagram of a basic car washer scheme.

Design example of the car washer product based on the present invention: as shown in FIG. 1, the product is mainly formed by a soft water bag (1), a manual change valve (2), a cover plate outer box with castors, an automatic take-up reel (6), an electric water pump, a water pipe (5) and a water gun. The soft water bag is made of a soft material and is foldable. The water bag is fully sealed in work and can be placed in the outer box after all water is discharged from the water bag.

Wherein the appearance of the cover plate outer box with castors is the same as that of a suitcase and is characterized in that four castors are mounted below the cover plate (4), and the cover plate (4) can be completely taken off, is cushioned under the box body (3) after being taken off and fixed via hooks. Thus, the cover plate outer box with castors becomes a trolley in use and becomes a suitcase in storage, so that portability is greatly increased.

Wherein the wire in the automatic take-up reel (6) must be long enough to surround the car by half a circle. Before use, the wire can be completely pulled out easily, and then the plug is inserted into a car cigarette lighter. After use, the wire can be automatically retracted via an elastic mechanism in the reel by pressing a button.

Figure 2:
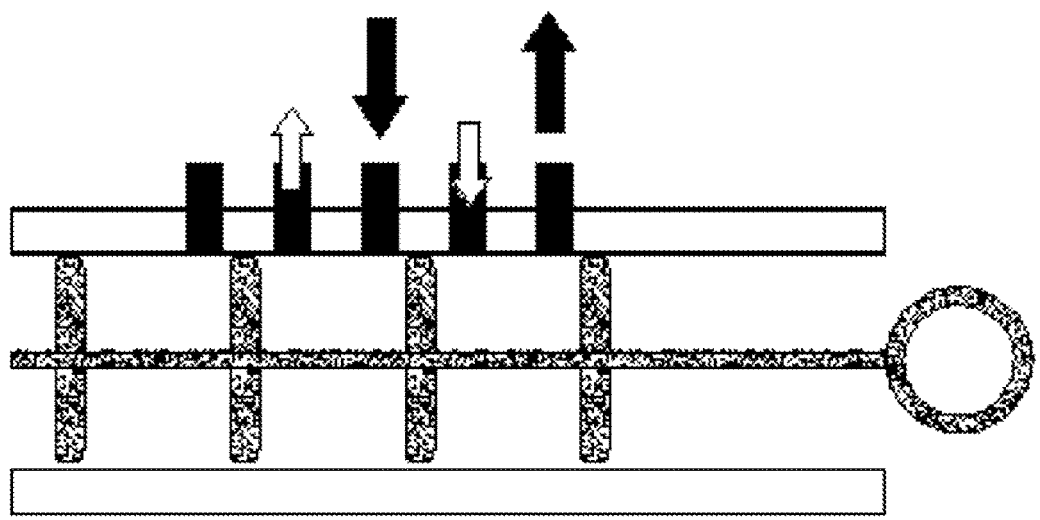
FIG. 2 is a sectional view of a two-position five-pass manual change valve in state one.
Figure 3:
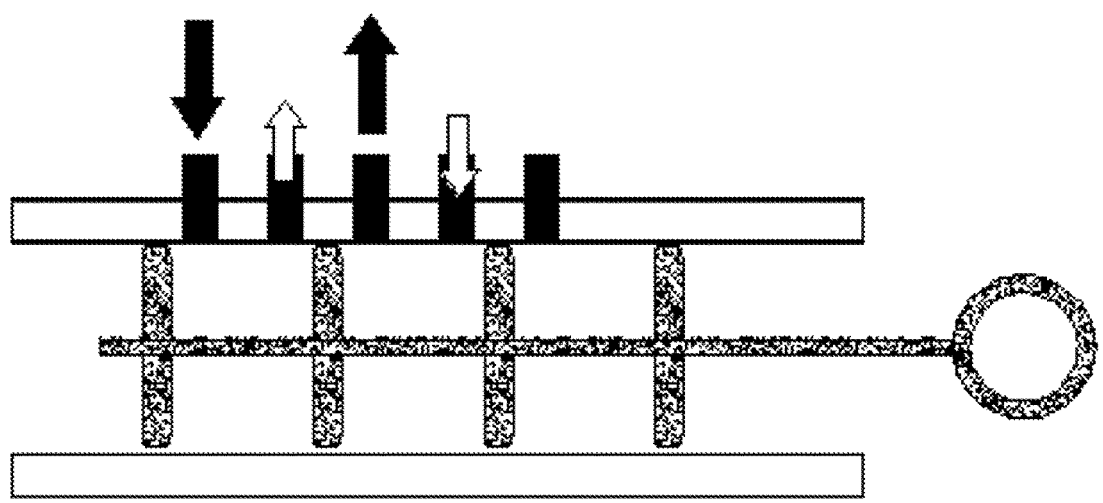
FIG. 3 is a sectional view of a two-position five-pass manual change valve in state two.

The water way connection of the change valve is shown in FIG. 2 or FIG. 3. The two-position five-pass manual valve in the figure has five water openings "R, A, P, B and S", R and S are connected with the water bag, P is connected with the water gun, and A and B are respectively connected with the water feeding and discharging openings of the water pump.

Figure 4:
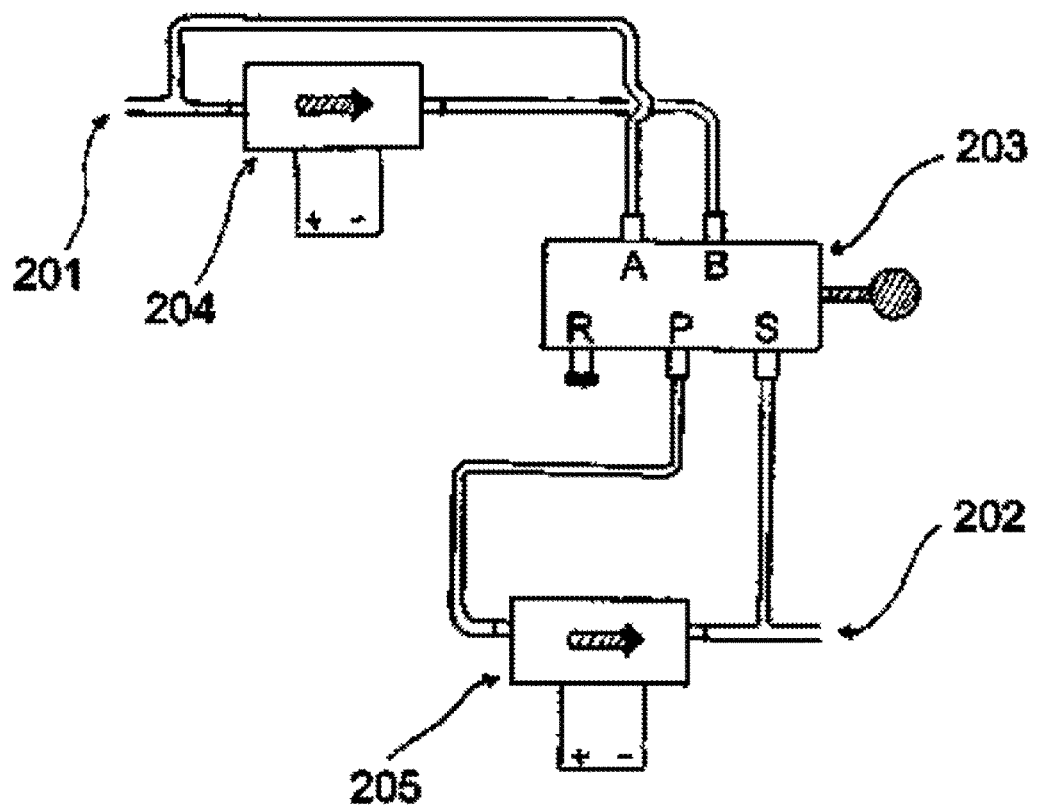
FIG. 4 is a water way diagram of an enhanced water pump formed by dual pumps and a hand valve.

For the work of the water way shown in FIG. 4, 203 in the figure is the two-position five-pass manual valve, and the opening R is blocked; during parallel connection, water flows in two separate ways from the feeding opening (201):

First way: Water is pumped to the change valve (203) via the pump 1 (204), and the opening B of the valve is communicated with the opening S to flow to the discharging opening (202);

Second way: Water flows to the change valve (203), the opening A of the valve is communicated with the opening P, and water is pumped to the discharging opening (202) via the pump 2 (205).

Water flow in series connection: At the moment, the opening B of the change valve (203) is communicated with the opening P, the opening A of the valve is communicated with the opening R, and the opening S is communicated with the discharging opening (202). Obviously, the water pipes communicated with the opening A and the opening S are not passages.

Water is pumped to the change valve (203) from the feeding opening (201) by the pump 1, and after passing through the opening B and the opening P, water is pumped to the discharging opening (202) by the pump 2 (205).

Figure 5:
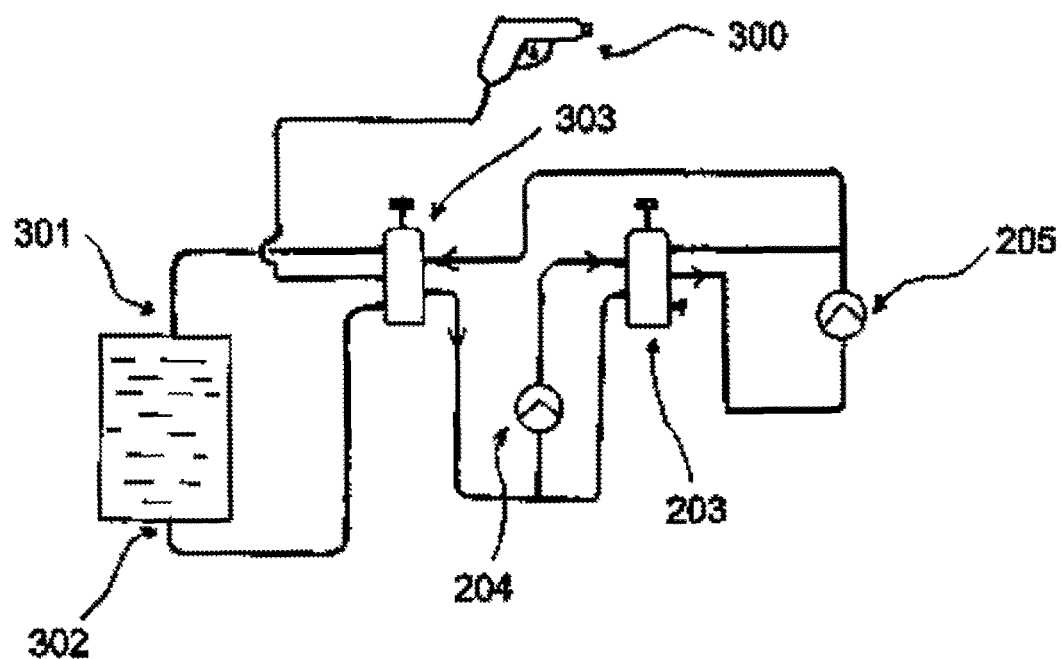
FIG. 5 is a water way diagram of an enhanced car washer using an enhanced pump.

FIG. 4 is combined with FIG. 1 to obtain FIG. 5. In the figure, 301 is the upper water feeding opening of the water bag, 302 is the lower water discharging opening, and both of them are connected to the two-position five-pass change valve (303). The switching of the change valve makes the water discharging pipe connected to the water gun 300 fill water into the upper water feeding opening 301 under the pumping of the enhanced water pump or draw water from the lower water feeding opening 302.

Figure 6:
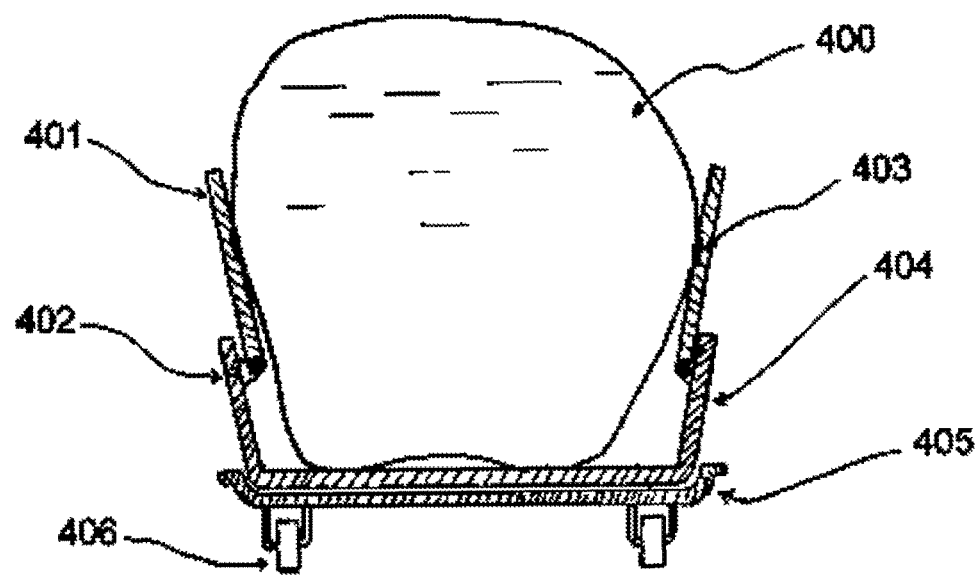
FIG. 6 is a sectional view of a water bag supported by a hinged door of an outer box.

In FIG. 6, 400 is the soft water bag, 401 is the hinged door panel, its rotating shaft 402 is located below the outer edge of the box body side wall 404, and the hinged door panel turns upwards to rest against the side wall to perform the function of supporting the water bag. 403 is the adhesion part between the outer surface of the water bag and the hinged door panel. When the water bag is empty and retracted, the adhesion part 403 pulls the hinged door panel 401 to be closed. The longitudinal section of the box body is inverted trapezoidal, which is convenient for storage and transportation of the box body during production.

405 at the bottom of the figure is an upper cover of the outer box. From the sectional view, it can be seen that the appearance of the upper cover is convex just like a tray, and the concave surface is just attached to the bottom surface of the box body to support the box body. The concave surface and the box body are not fixed by using hanging buckles, but are attracted by using a magnet. The upper cover and the bottom of the box body are preferably provided with water drainage holes. 406 mounted below the upper cover are castors. The number of the castors is usually four, wherein the two front castors should be steerable castors capable of steering on a horizontal plane, and the two rear castors are non-steerable castors. In this way, the castors are flexible and convenient to use.

Figure 7:
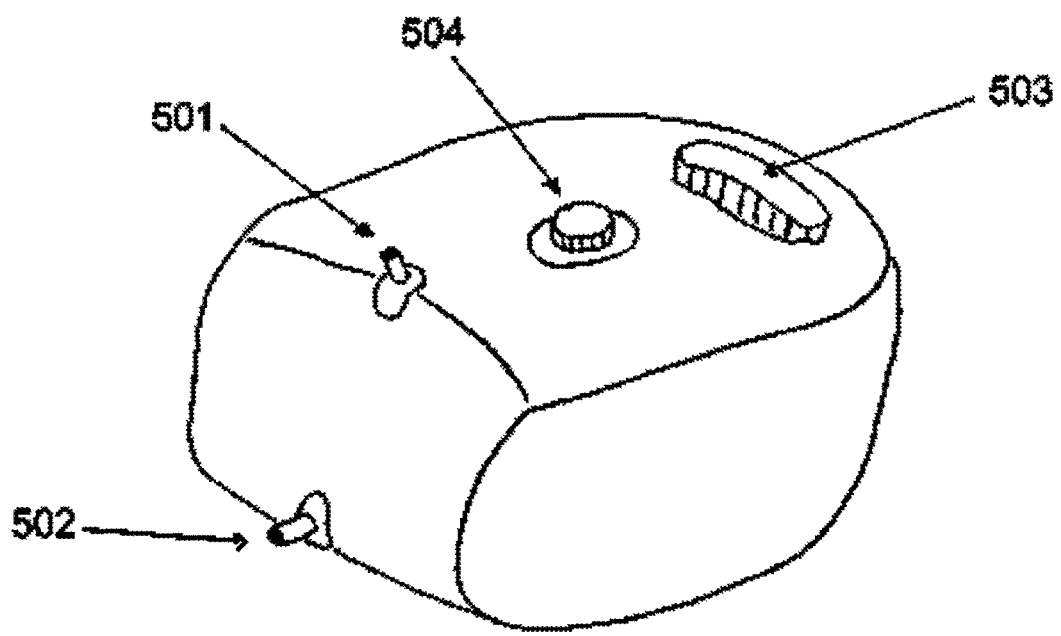
FIG. 7 is a diagram of a water bag with dual communicated water openings and sponge inside.

For the water bag shown in FIG. 7, wherein 501 is the upper water feeding opening, and 502 is the lower water discharging opening. The inner surface of the water bag should be provided with a circle of bulges such as floating points, lumps and teeth surrounding the water discharging opening in the position of the lower water discharging opening. The action can prevent two surfaces from being attracted to block the water discharging opening when the water bag will be collapsed. 503 is the sponge fixed above the inside of the water bag and is used for absorbing remaining water as priming water for next water pumping. 504 is an openable opening cover and is mainly used for facilitating the cleaning and curing of the water bag, which is not necessary.

Figure 8:
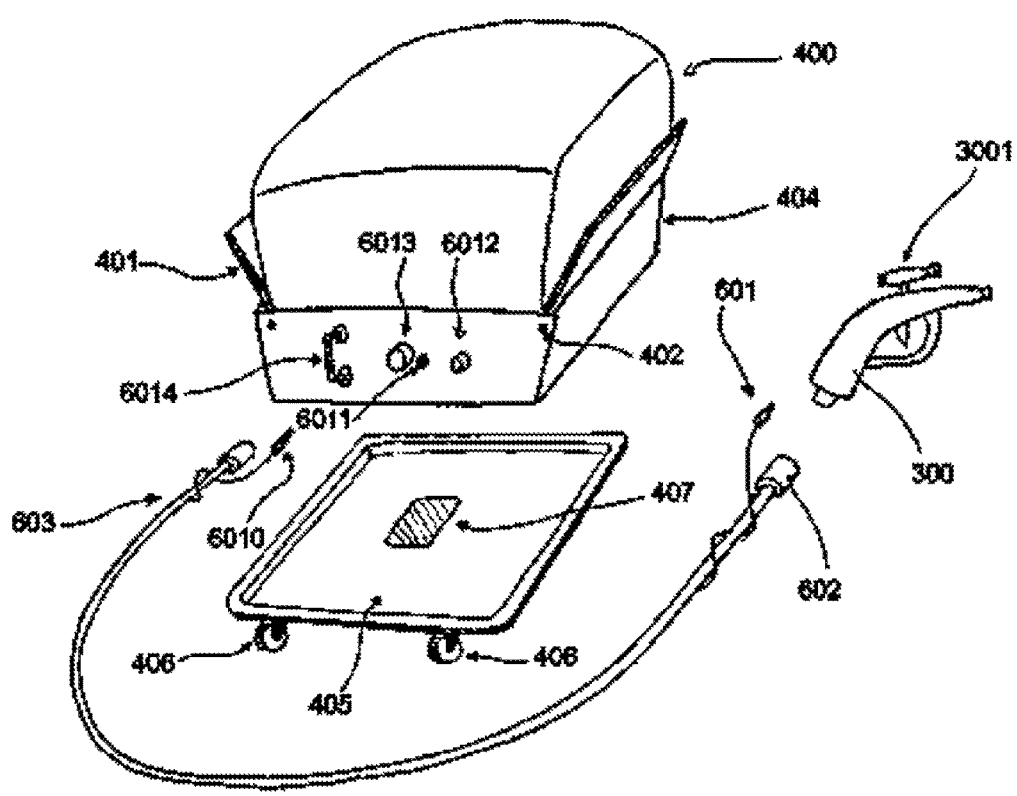
FIG. 8 is an overall outside view of an enhanced car washer.

FIG. 8 shows the appearance of the enhanced car washer. In the figure: the rotating shaft 402 of the hinged door panel 401 is located below the outer edge of the box body side wall 404, and the hinged door panel 401 rests against the box body side wall 404 to support the soft water bag 400 filled with water. 6014 on the front control panel is a main pulling handle of the change valve, which links the two manual change valves to work simultaneously, so that dual pumps are connected in parallel to increase the water quantity during water pumping, while the dual pumps are connected in series to increase the water pressure during spraying.

A battery is installed inside the car washer, and 6012 is a power switch; 6013 is the water discharging opening of the car washer and is connected with the water discharging pipe 603 via a quick connector. The water discharging pipe is also provided with a power connection plug 6010 used for being inserted into a power connection socket hole 6011 to supply power to the lamp 3001 on the water gun 300, and 601 at the other end of the water discharging pipe is an electric plug used for connecting the lamp 3001; 602 is a water pipe quick connector and is used for connecting the water gun 300. 405 is the upper cover of the outer box and is cushioned under the box body, and the upper cover and the box body are mutually attracted via a magnet 407. 406 are castors with steering function.

The car washer in FIG. 8 also has the following dimension and scale features:

1. The wheelbase of the front and the rear castors of the upper cover 405 is greater than or equal to the width of the upper cover, which is convenient for crossing and stacking of the upper cover in warehousing and transportation;

2. Castors can be placed in the box body when the upper cover 405 covers the outer box. The upper cover is the largest surface out of six surfaces of the outer box so that a long wheelbase and a wide tread can be created to stabilize the bearing water bag; and if the upper cover is designed to cover the box body, four castors are located outside the box body in a shape of holding the box body. It is considered that "castors can be placed in the box body" in such design;

3. The length of the water discharging pipe 603 is less than or equal to the rated suction height of the water pump, larger than the height of the car, and not enough to move around the car by half a circle, so that the car washer has to move along with a user during car washing to completely spray around the car; and 4. The water discharging pipe, the water gun, etc. can be placed in the box body.

I claim:

1. An electric car washer, comprising: a water bag (1), a change valve (2), an outer box, an electronic water pump, a water gun, and a water discharging pipe (5);

wherein an opening of the change valve (2) is connected with the water bag (1), the water discharging pipe (5), water feeding and discharging opening of water pump respectively the change valve (2) has two working operations, when the change valve (2) is switched to working position one, water feeding opening of water pump is connected with the water discharging pipe (5), water discharging opening of water pump is connected with the water bag (1), water flows into the water bag (1) via the change valve (2) from the water discharging pipe (5); when the change valve (2) is switched to working position two, water discharging opening of water pump is connected with the water discharging pipe (5), water feeding opening of water pump is connected with the water bag (1), water flows out of the water discharging pipe (5) via the change valve (2) from the water bag (1); after all water is discharged from the water bag (1), the water bag (1) can be placed in the outer box; the outer box is provided with castors to movably support the water bag (1).

2. The electric car washer according to claim 1, wherein the outer box is comprises a box body (3) and a cover plate (4); the cover plate (4) covers the box body (3); the castors are mounted below the cover plate (4); and the cover plate being taken off and is cushioned and fixed on a bottom of the box body (3) to movably support the box body (3).

3. The electric car washer according to claim 1, wherein the water discharging pipe (5) sustains tension to drag the car washer to move along with the user.

4. The electric car washer according to claim 1, characterized in that two door panels (401) opening upwards in opposite directions are installed in the box body; the rotating shaft (402) of the door panels is fixed below the outer opening edge of the box body; the door panels opening upwards rest against the side walls (404) of the box body so as to support the water bag (400); the inner surfaces of the door panels are adhered to the outer surface of the water bag (400); and when the water bag (400) is empty and collapsed, the door panels (401) are pulled by the adhesion part (403) to be closed.

5. The electric car washer according to claim 2, wherein two door panels (401) opening opened upwards in opposite directions are installed in the box body; the rotating shaft (402) of the door panels is fixed below the outer opening edge of the box body; the door panels opening upwards rest against the side walls (404) of the box body so as to support the water bag (400); the inner surfaces of the door panels are adhered to the outer surface of the water bag (400); and when the water bag (400) is empty and collapsed, the door panels (401) are pulled by the adhesion part (403) to be closed.

6. The electric car washer according to claim 3, wherein two door panels (401) opening opened upwards in opposite directions are installed in the box body; the rotating shaft (402) of the door panels is fixed below the outer opening edge of the box body; the door panels opening upwards rest against the side walls (404) of the box body so as to support the water bag (400); the inner surfaces of the door panels are adhered to the outer surface of the water bag (400); and when the water bag (400) is empty and collapsed, the door panels (401) are pulled by the adhesion part (403) to be closed.

7. The electric car washer according to claim 1, wherein another one electronic water pump and another one change valve (203) are added; water feeding and discharging openings of the two water pumps are all connected to the change valve (203); the switching of the change valve (203) makes the two water pumps connected in parallel during water filling and connected in series during spraying.

8. The electric car washer according to claim 2, wherein another one electronic water pump and another one change valve (203) are added; water feeding and discharging openings of the two water pumps are all connected to the change valve (203); the switching of the change valve (203) makes the two water pumps connected in parallel during water filling and connected in series during spraying.

9. The electric car washer according to claim 3, wherein another one electronic water pump and another one change valve (203) are added; water feeding and discharging openings of the two water pumps are all connected to the change valve (203); the switching of the change valve (203) makes the two water pumps connected in parallel during water filling and connected in series during spraying.

10. The electric car washer according to claim 4, wherein another one electronic water pump and another one change valve (203) are added; water feeding and discharging openings of the two water pumps are all connected to the change valve (203); the switching of the change valve (203) makes the two water pumps connected in parallel during water filling and connected in series during spraying.

11. The electric car washer according to claim 5, wherein another one electronic water pump and another one change valve (203) are added; water feeding and discharging openings of the two water pumps are all connected to the change valve (203); the switching of the change valve (203) makes the two water pumps connected in parallel during water filling and connected in series during spraying.

12. The electric car washer according to claim 6, wherein another one electronic water pump and another one change valve (203) are added; water feeding and discharging openings of the two water pumps are all connected to the change valve (203); the switching of the change valve (203) makes the two water pumps connected in parallel during water filling and connected in series during spraying.

13. An electric car washer, comprising: a water bag (1), an outer box, an electronic water pump, a water gun, and a water discharging pipe (5); after all water is discharged from the water bag (1), the water bag (1) can be placed in the outer box; the outer box is provided with a castor to movably support the water bag (1); the water discharging pipe (5) sustains tension to drag the car washer to move along with the user; the outer box comprises a box body (3) and a cover plate (4); the cover plate (4) covers the box body (3); the castor is mounted below the cover plate (4), the cover plate being taken off and is cushioned and fixed on a bottom of the box body (3) to movably support the box body (3); two door panels (401) in the outer box which can be opened upwards in opposite directions are installed in the box body; the rotating shaft (402) of the door panels is fixed below the outer opening edge of the box body; the door panels opening upwards rest against the side walls (404) of the box body so as to support the water bag (400); the inner surfaces of the door panels are adhered to the outer surface of the water bag (400); and when the water bag (400) is empty and collapsed, the door panels (401) are pulled by the adhesion part (403) to be closed.

* * * * *